United States Patent
Redfern et al.

(10) Patent No.: US 7,274,736 B2
(45) Date of Patent: Sep. 25, 2007

(54) MULTIPLE PATH EQUALIZATION FOR MULTICARRIER SYSTEMS

(75) Inventors: Arthur John Redfern, Plano, TX (US); Nirmal C. Warke, Dallas, TX (US); Ming Ding, Austin, TX (US)

(73) Assignee: Texas Instruments Incorporated, Dallas, TX (US)

( * ) Notice: Subject to any disclaimer, the term of this patent is extended or adjusted under 35 U.S.C. 154(b) by 699 days.

(21) Appl. No.: 10/274,322

(22) Filed: Oct. 18, 2002

(65) Prior Publication Data

US 2003/0091133 A1 May 15, 2003

Related U.S. Application Data

(60) Provisional application No. 60/351,430, filed on Jan. 28, 2002, provisional application No. 60/342,618, filed on Dec. 27, 2001, provisional application No. 60/334,999, filed on Oct. 24, 2001.

(51) Int. Cl.
*H04B 3/14* (2006.01)
*H04B 1/66* (2006.01)
*H04B 15/00* (2006.01)
*H04B 1/10* (2006.01)
*H04N 7/12* (2006.01)

(52) U.S. Cl. ............... 375/229; 375/240.27; 375/285; 375/346; 708/300; 708/323; 333/166; 333/28 R

(58) Field of Classification Search ............... None
See application file for complete search history.

(56) References Cited

U.S. PATENT DOCUMENTS

| | | | |
|---|---|---|---|
| 6,240,129 B1 * | 5/2001 | Reusens et al. | 375/222 |
| 6,353,629 B1 * | 3/2002 | Pal | 375/222 |
| 6,408,022 B1 * | 6/2002 | Fertner | 375/230 |
| 6,456,673 B1 * | 9/2002 | Wiese et al. | 375/346 |
| 6,687,291 B1 * | 2/2004 | Lee et al. | 375/229 |
| 6,690,717 B1 * | 2/2004 | Kim et al. | 375/219 |
| 6,754,262 B1 * | 6/2004 | Citta et al. | 375/232 |
| 6,781,965 B1 * | 8/2004 | Milosevic et al. | 370/286 |
| 6,782,005 B1 * | 8/2004 | Matsumoto et al. | 370/468 |
| 7,023,938 B1 * | 4/2006 | Kapoor et al. | 375/350 |
| 7,031,379 B2 * | 4/2006 | Sestok et al. | 375/219 |
| 2002/0048334 A1 * | 4/2002 | Hasegawa | 375/360 |
| 2003/0118094 A1 * | 6/2003 | Wang et al. | 375/231 |

OTHER PUBLICATIONS

Qian et al, "Space Dirversity Reception and Parallel Blind Equalization in Short-Burst TDMA Systems", IEEE Transactaions on Vehicular Technology, vol. 51, No. 1, Jan. 2002, pp. 122-129.*

Shimamura, Tetsuya, "A Parallel Equaliser with LMS Adaptation for Time Variant Multipath Channels", The 1998 IEEE Asia-Pacific Conference on Circuits and Systems, Nov. 24-27, 1998, pp. 439-442.*

* cited by examiner

*Primary Examiner*—David C. Payne
*Assistant Examiner*—Linda Wong
(74) *Attorney, Agent, or Firm*—W. James Brady, III; Frederick J. Telecky, Jr.

(57) ABSTRACT

A dual path equalization structure is used to equalize DMT systems operating over channels in which different impairments dominate the performance of different parts of the channel. Two TEQ/DFT structures are used to process the received signal, each optimized for a different part of the channel. The outputs of the two paths are combined with appropriate frequency-domain equalization to achieve an overall equalization architecture which is better optimized for the whole channel.

25 Claims, 1 Drawing Sheet

MULTIPLE PATH EQUALIZATION FOR MULTICARRIER SYSTEMS

CROSS-REFERENCE TO RELATED APPLICATIONS

This application claims right of priority under 35 U.S.C. 119 for provisional applications Ser. No. 60/334,999 filed Oct. 24, 2001, Ser. No. 60/342,618 filed Dec. 27, 2001, and Ser. No. 60/351,430 filed Jan. 28, 2002 entitled "Dual Path Equalization For Multicarrier Systems" by same inventors Arthur John Redfern; Nirmal C. Warke and Ming Ding. This application is incorporated herein by reference.

FIELD OF INVENTION

This invention relates to communication systems using multicarrier modulation and more particularly to multiple path equalization of multicarrier communication systems.

BACKGROUND OF INVENTION

Most modem communications systems that operate near theoretical capacity limits employ equalization in the receiver to maximize the data rate. Multicarrier modulation systems such as discrete multitone (DMT) often use both time-domain equalization and frequency-domain equalization.

In typical DMT systems, data is segmented into blocks of N samples. At the transmitter, an inverse fast Fourier transform (IFFT) of the data is taken, and a cyclic prefix is appended to the beginning. For a length L cyclic prefix, this is done by appending the last L samples of the IFFT of the data to the beginning. At the receiver, the first L samples are skipped, and the remaining N samples are processed. If the channel length is shortened by the time-domain equalizer (TEQ) to L+1 samples or less, then the original data can be recovered by taking the fast Fourier transform (FFT) of the remaining N samples, and multiplying each resulting sample by the corresponding complex frequency-domain equalizer (FEQ) coefficient (effectively undoing the effects of the combined channel response at that frequency).

In order to achieve near capacity data rates the TEQ needs to compensate for intersymbol interference (ISI) due to the channel while at the same time appropriately filtering impairments such as echo, crosstalk, and radio frequency interference (RFI). These impairments tend to affect different parts of the channel. For typical frequency division duplex (FDD) deployments of asymmetrical digital subscriber lines (ADSL), a common DMT system, there is strong ISI (from bandsplit filters) and a large echo near the transition band. Higher up in frequency and farther away from the transition band the ISI and echo are less severe, but RFI is more likely to be present.

Using a single TEQ/FEQ to compensate for the impairments that affect different parts of the channel results in a performance tradeoff. The best TEQ in terms of data rate is not necessarily optimal for any particular part of the channel; however, it is also not bad for any particular part of the channel.

SUMMARY OF INVENTION

In accordance with one embodiment of the present invention a dual path equalization structure is used to equalize DMT systems operating over channels in which different impairments dominate the performance of different parts of the channel. Two TEQ/DFT structures are used to process the received signal, each optimized for a different part of the channel. The outputs of the two paths are combined with appropriate frequency-domain equalization to achieve an overall equalization architecture which is better optimized for the whole channel.

DESCRIPTION OF PREFERRED EMBODIMENT OF THE PRESENT INVENTION

Design Philosophy

The basic teaching behind the design of the dual path equalizer is to divide the channel into two parts, each part dominated by a different type of impairment. The first equalization path is optimized for one part of the channel, and the second equalization path for the other part of the channel. TEQ design techniques such as minimum ISI, minimum mean squared error (MSE), eigenvector based, least squares (and adapted variants), and maximum bit rate methods can be used to design the TEQs used in the different parts of the channel.

For a FDD ADSL system operating on a typical wireline channel, this can be done for the downstream by dividing the downstream portion of the channel into the downstream region near the transition band, and the downstream region higher up in frequency. The transition band or region is the region of the channel that separates the upstream subchannels and the downstream subchannels. For example, if subchannels 6-31 are used for the upstream and subchannels 39-255 for the downstream, then the transition band would comprise subchannels 32-38. Note that there is a direct mapping between subchannels and frequencies.

As previously indicated, the area around the transition region is dominated by the echo from the upstream and strong ISI from the bandsplit filters. The subchannels higher up in frequency tends to have milder ISI and impairments such as RFI.

Path 1: Optimized for the Region Near the Transition Band

Figure 1:
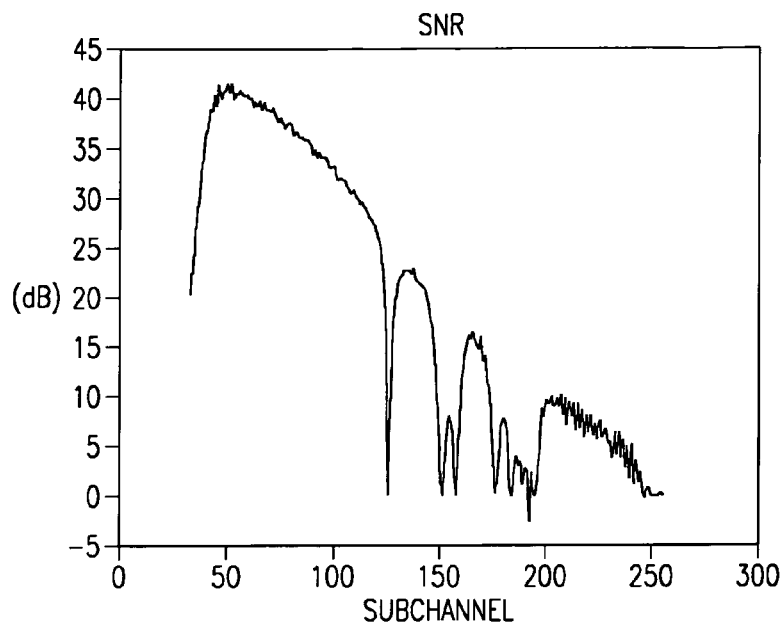
FIG. 1 illustrates an example of the received signal to noise ratio for a 12 kft 26 American wire gauge (AWG) channel with North American RFI model 1.
Figure 2:
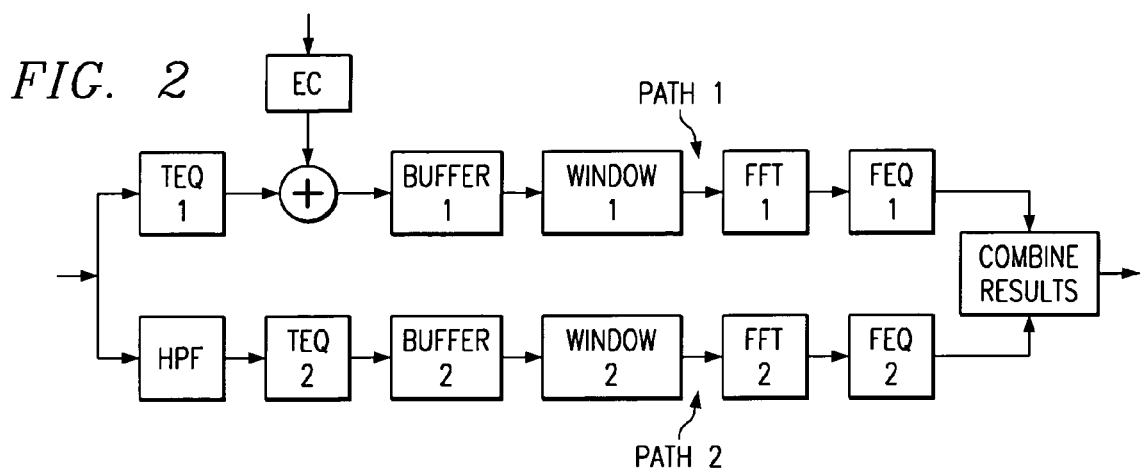
FIG. 2 illustrates a dual path equalization system for a FDD ADSL system in accordance with one embodiment of the present invention.

FIG. 2 illustrates an example of a dual path equalization architecture that can be optimized for a typical wireline channel. The upper path on FIG. 2, labeled path 1, is optimized for the subchannels near the transition band. For the above downstream FDD ADSL example, this could comprise subchannels around 39-60. As such TEQ 1 is optimized to compensate for the IST from the transmit and receive filters.

TEQ 1 could be trained without the transmit signal such that the echo does not limit its performance. An echo canceller (EC) is present to remove the echo energy (which tends to be strong in this part of the channel) while leaving behind the received signal. Because the echo canceller is located after the TEQ 1, both standard time-domain and frequency-domain updates can be used. Note that the presence of the echo canceller allows less severe transmit and receive filters, which simplifies the task of TEQ 1.

Buffer 1 is used to convert from sample by sample processing (done by the TEQ and possibly the EC) to block by block processing (done by the window, FFT, and FEQ).

Because RFI is less of a problem in this part of the channel, the time-domain window length at window 1 would tend to be zero, making the windowing operation equivalent to prefix removal. The output of window 1 is applied to the first FFT (FFT 1), used to demodulate the received signal, followed by FEQ 1, used to compensate for the individual subchannel responses. The windowing operation performs windowing on the noise on paths where narrow band interferes effect performance. Receiver windowing is well known to those of ordinary skill in the art. For example, see article entitled "Receiver Window Design for Multicarrier Communications System" by Arthur Redfern in Selected Areas in Communications, Volume 20, Issue 5, June 2002, page(s); 1029-1036. Also see many receiver windowing articles cited in the paper.

Path 2: Optimized for the Remainder of the Channel

The lower path in FIG. 2, labeled path 2, is optimized for the remainder of the channel. Continuing with the downstream FDD ADSL example, the term remainder of the channel refers to subchannels 61-255.

A high pass filter (HPF) is included to remove the echo energy (which can spread to higher subchannels but is difficult to cancel because of the large received signal). TEQ 2 is designed to provide a high signal to noise ratio (SNR) across the band.

Buffer 2 is used to convert from sample by sample processing (done by the TEQ) to block by block processing (done by the window, FFT, and FEQ).

Window 2, which also includes prefix removal, can be made nonzero in length to improve RFI performance. Making the window nonzero in length does not significantly degrade the performance of TEQ 2, since the task of the equalizer is easier on this part of the channel. The output of window 2 is applied to the second FFT (FFT 2), used to demodulate the received signal, followed by FEQ 2, used to compensate for the individual subchannel responses.

Combining the Outputs of the Paths

Combining the results of the two paths can be done in a variety of ways to yield different results.

Figure 3:
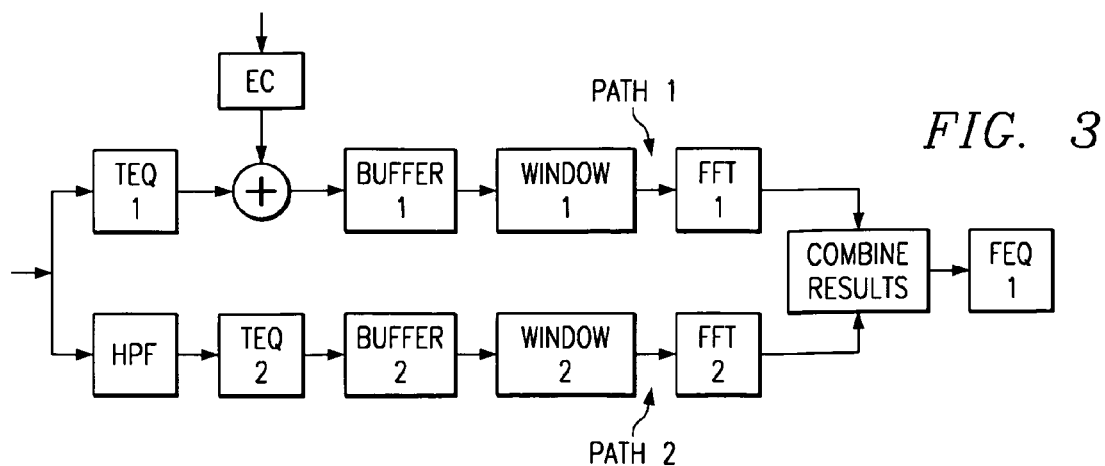
FIG. 3 illustrates a dual path equalization system for a FDD ADSL in accordance with a second embodiment of the present invention wherein a single FEQ is applied after combining.

The simplest method of combining the two paths is to measure the signal to noise ratio (SNR) for each path on a subchannel by subchannel basis, and for each subchannel select the output of the path with the best SNR. If the first path is optimized for the transition band and the second path is optimized for the remainder of the channel, then it would be expected that the best SNR subchannels around the transition band would come from path 1, and the best SNR subchannels for the remainder of the band would come from path 2. In this case the combining (selection) could be done after the FFT and only a single FEQ is required as illustrated in FIG. 3.

An alternative is to exploit the differences in the noise on the two paths, and appropriately sum the scaled subchannels to further improve the SNR. The scaling is done to give more weight to the subchannel on the path with the better SNR. In order for this to be effective, some noise sources (e.g., residential ISI, residual echo) need to be uncorrelated across the two paths.

A third possibility that the dual path structure allows is to implement a complex coefficient TEQ. Since the received signal is real, there is no coupling between the first and second paths (which can be viewed as the real and imaginary paths). After the FFT, the outputs of the two paths can be summed after multiplying the second path by imaginary 1. In this case only a single FEQ is required.

The above embodiment is by way of example. The dual path equalization architecture may only include the time-domain equalizers and need not include the echo canceller or the high pass filter. These may be added or removed depending on the system requirements. While dual paths are illustrated any number of multiple paths may be used. It will be understood by those skilled in the art that other embodiments of the invention, variations, and modifications will be apparent from a consideration of the specification as disclosed herein and fall within the scope of the invention as defined by the following claims.

The invention claimed is:

1. A method of equalization for a multicarrier communication system operating over a channel in which different impairments affect different parts of the channel comprising the steps of:

processing a received signal with more than one equalization structure where each equalization structure is in a different one of a plurality of paths including a time domain equalizer (TEQ) and Fast Fourier Transform (FFT) optimized for a different part of the channel; and combining outputs of the equalization structures in different paths to form an estimate of the transmitted signal, wherein said combining step on a subchannel by subchannel basis selects the output of the path with the best signal to noise ratio (SNR).

2. The method of claim 1, wherein each TEQ is designed using one or more of the minimum intersymbol interference (ISI), minimum mean square error (MSE), eigenvector based, least squares (and adaptive variants), or maximum bit rate methods.

3. The method of claim 1, wherein at least one of said plurality of paths includes an echo canceller (EC).

4. The method of claim 3, wherein the BC is on paths optimized for the part of the channel near the transition band between upstream and downstream signals.

5. The method of claim 1 wherein said plurality of paths includes a windowing operation.

6. The method of claim 5, wherein the windowing operation performs only cyclic prefix removal on paths optimized for parts of the channel where narrowband interferers do not effect performance.

7. The method of claim 5, wherein the windowing operation performs windowing on the noise on paths where narrow band interferers effect performance.

8. The method of claim 1, wherein the combining step adds together the outputs of two of the plurality of paths.

9. The method of claim 1, wherein a plurality of paths include a frequency-domain equalizer (FEQ).

10. The method of claim 1, wherein a frequency-domain equalizer (FEQ) is applied after the combining step.

11. The method of claim 1, wherein said plurality of paths are two paths.

12. A method of equalization for a multicarrier communication system operating over a channel in which different impairments affect different parts of the channel comprising the steps of:

processing a received signal with more than one equalization structure where each equalization structure is in a different one of a plurality of paths including a time domain equalizer (TEQ) and Fast Fourier Transform (FFT) optimized for a different part of the channel; said plurality of paths are two paths and one path is optimized for the channel near the transition band, and the other path is optimized for the channel farther from the transition band; and combining outputs of the equalization structures in different paths to form an estimate of the transmitted signal.

13. The system of claim 12 herein each said TEQ is designed using one or more of the minimum intersymbol interference (ISI), minimum mean square error (MSE), eigenvector based, least squares (and adaptive variants), or maximum bit rate methods.

14. The system of claim 12, wherein at least one of said dual paths includes an echo canceller (EC).

15. The system of claim 14, wherein the echo canceller (BC) is on paths optimized for the part of the channel near the transition band between upstream and downstream signals.

16. The system of claim 12, wherein said dual paths includes a windowing operation.

17. The system of claim 16, wherein the windowing operation performs only cyclic prefix removal on paths optimized for parts of the channel where narrow band interferers do not effect performance.

18. The system of claim 16, wherein the windowing operation performs windowing on the noise on paths where narrow band interferers effect performance.

19. The system of claim 12, wherein said combiner adds together the outputs of said dual paths.

20. The system of claim 12, wherein dual paths include a frequency-domain equalizer (FEQ).

21. The system of claim 12, wherein an FEQ is applied after the combiner.

22. In a multicarrier communication system operating over a channel in which different impairments affect different parts of the channel, the improvement comprising:

a first and second path for processing a received signal;

said first path having a first equalization structure optimized for a first part of the channel and including a first time domain equalizer (TEQ) and a first Fast Fourier Transform (FFT);

said second path having a second equalization structure optimized for a second part of the channel and including a second time domain equalizer (TEQ) and second Fast Fourier Transform (FFT); and a combiner for combining the outputs of said first and second paths to form an estimate of the transmitted signal, wherein said combiner combines said outputs on a subchannel by subchannel basis and selects the output of the path with the best signal to noise ratio (SNR).

23. In a multicarrier communication system operating over a channel in which different impairments affect different parts of the channel, the improvement comprising:

a first and second path for processing a received signal;

said first path having a first equalization structure optimized for a first part of the channel and including a first time domain equalizer (TEQ) and a first Fast Fourier Transform (FFT);

said second path having a second equalization structure optimized for a second part of the channel and including a second time domain equalizer (TEQ) and second Fast Fourier Transform (FFT); and a combiner for combining the outputs of said first and second paths to form an estimate of the transmitted signal, wherein said combiner produces a weighted average of the outputs of said dual paths to improve the SNR.

24. In a multicarrier communication system operating over a channel in which different impairments affect different parts of the channel, the improvement comprising:

a first and second path for processing a received signal;

said first path having a first equalization structure optimized for a first part of the channel and including a first time domain equalizer (TEQ) and a first Fast Fourier Transform (FFT);

said second path having a second equalization structure optimized for a second part of the channel and including a second time domain equalizer (TEQ) and second Fast Fourier Transform (FFT); one path of said first and second path is optimized for the channel near the transition band, and the other path of said first and second path is optimized for the channel farther from the transition band; and a combiner for combining the outputs of said first and second paths to form an estimate of the transmitted signal.

25. A method of equalization for a multicarrier communication system operating over a channel in which different impairments affect different parts of the channel comprising the steps of:

processing a received signal with more than one equalization structure where each equalization structure is in a different one of a plurality of paths including a time domain equalizer (TEQ) and Fast Fourier Transform (FFT) optimized for a different part of the channel; and combining outputs of the equalization structures in different paths to form an estimate of the transmitted signal, wherein the combining step produces a weighted average of the outputs of said plurality of paths to improve the SNR.

* * * * *